US012293882B2

(12) United States Patent
Palmer

(10) Patent No.: US 12,293,882 B2
(45) Date of Patent: May 6, 2025

(54) MOLDED BUTTONS

(71) Applicant: Snap One, LLC, Salt Lake City, UT (US)

(72) Inventor: Matthew Thomas Palmer, Sandy, UT (US)

(73) Assignee: Snap One, LLC, Salt Lake City, UT (US)

( * ) Notice: Subject to any disclaimer, the term of this patent is extended or adjusted under 35 U.S.C. 154(b) by 0 days.

(21) Appl. No.: 17/880,320

(22) Filed: Aug. 3, 2022

(65) Prior Publication Data

US 2024/0047153 A1 Feb. 8, 2024

(51) Int. Cl.

| | |
|---|---|
| ***H01H 13/83*** | (2006.01) |
| ***H01H 13/02*** | (2006.01) |
| ***H01H 13/04*** | (2006.01) |
| ***H01H 13/10*** | (2006.01) |
| ***H01H 13/14*** | (2006.01) |

(52) U.S. Cl.

CPC .......... *H01H 13/023* (2013.01); *H01H 13/04* (2013.01); *H01H 13/10* (2013.01); *H01H 13/14* (2013.01); *H01H 2221/07* (2013.01); *H01H 2223/012* (2013.01); *H01H 2229/044* (2013.01)

(58) Field of Classification Search

CPC ............. H01H 13/83; H01H 2219/062; H01H 2219/039; H01H 13/023; H01H 2219/06; H01H 2221/07; H01H 9/181; H01H 2219/036; H01H 2219/044; H01H 2013/026; H01H 9/16; H01H 2219/0622; H01H 2219/037

See application file for complete search history.

(56) References Cited

U.S. PATENT DOCUMENTS

| | | | | |
|---|---|---|---|---|
| 5,404,133 A * | 4/1995 | Moriike | H01H 13/023 | 362/23.17 |
| 5,655,826 A * | 8/1997 | Kouno | H01H 13/702 | 362/23.06 |
| 2020/0321169 A1* | 10/2020 | Xiao | H01H 13/14 | |

* cited by examiner

*Primary Examiner* — Ahmed M Saeed

(74) *Attorney, Agent, or Firm* — Greenberg Traurig, LLP; Nicholas Martin; David J. Dykeman

(57) ABSTRACT

Examples of molded buttons are described. In some examples, a button includes a transparent molded member. The button includes an opaque molded member attached to the transparent molded member. The opaque molded member includes a shield positioned along an edge of the transparent molded member. The shield is disposed to reduce backlight from exiting at the edge of the transparent molded member.

18 Claims, 6 Drawing Sheets

MOLDED BUTTONS

TECHNICAL FIELD

The present disclosure relates generally to buttons. More specifically, the present disclosure relates to molded buttons for electrical devices.

BACKGROUND

In recent years, the use of electrical devices has increased dramatically. Some electrical devices have also increased in capability and/or complexity.

Many varieties of electrical devices are conveniently used in homes and businesses. Many homes and businesses include multiple electrical devices to assist in everyday tasks. For example, electrical devices may be used for convenience and/or control.

However, some electrical devices may provide poor functionality or may work inconsistently. For instance, some electrical devices may fail to work and/or may malfunction in some cases. As can be observed from this discussion, improvements to the reliability, functionality, and/or features of electrical devices may be beneficial.

DETAILED DESCRIPTION

Figure 1:
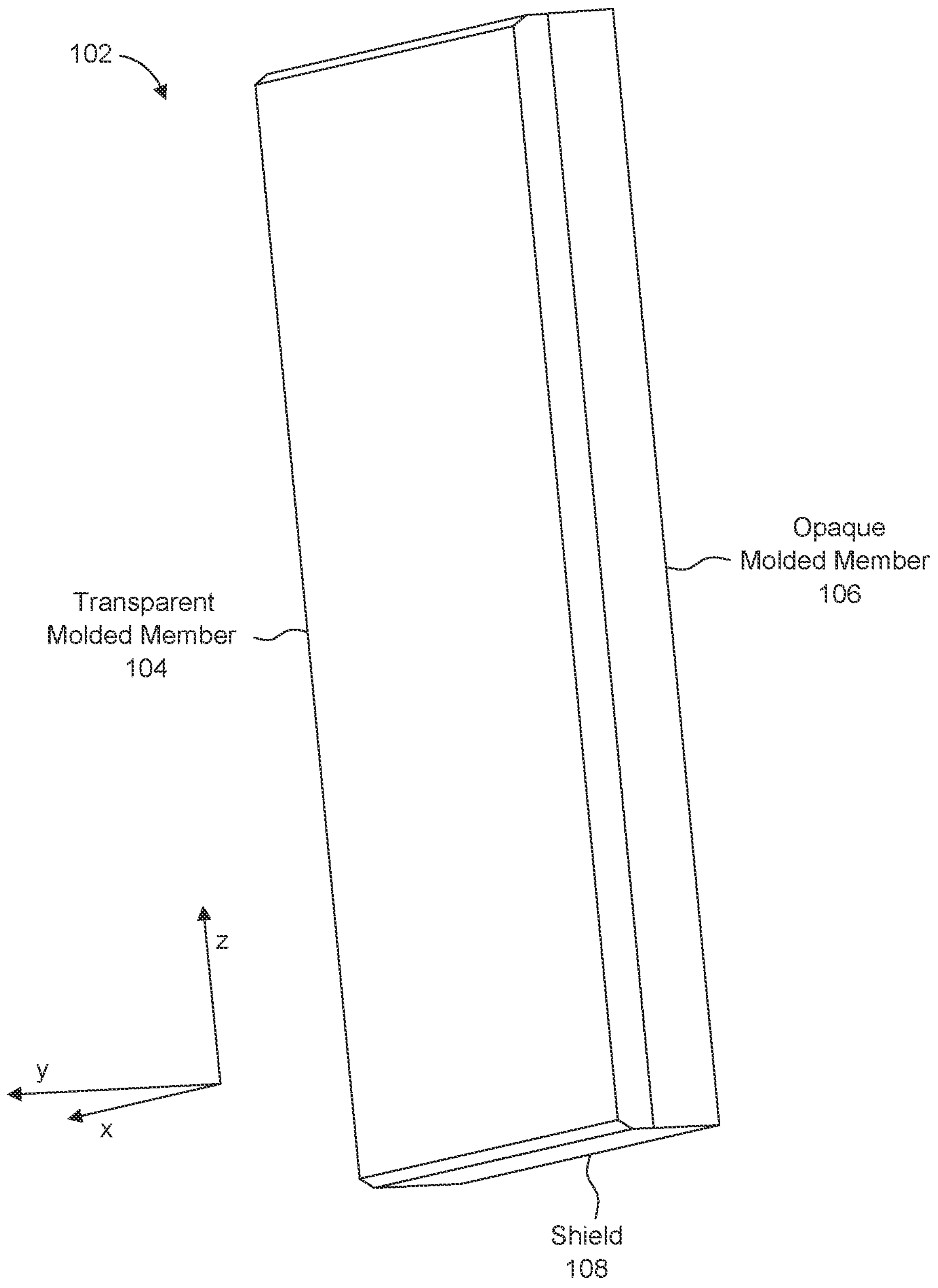
FIG. 1 is a diagram illustrating a perspective view of an example of a button in accordance with some of the techniques and structures described herein.

A button is described. The button includes a transparent molded member. The button also includes an opaque molded member attached to the transparent molded member. The opaque molded member includes a shield positioned along an edge of the transparent molded member. The shield is disposed to reduce backlight from exiting at the edge of the transparent molded member.

The shield may extend along an entire periphery of the transparent molded member. An outer surface of the shield may be flush with the edge of the transparent molded member.

The transparent molded member may include a lip along the edge. The lip may be disposed over a step structure of the opaque molded member. The transparent molded member may include a bevel between a facial surface and a side surface of the transparent molded member.

The transparent molded member may include a platform disposed in a window of the opaque molded member. The platform may include first teeth intermeshed with second teeth of the opaque molded member. The opaque molded member may include an alignment feature disposed on the platform to align a backlight guide.

A facial surface of the transparent molded member may be covered with a paint. The paint may be etched to allow the backlight to exit the facial surface in a location where the paint is etched.

The shield may be disposed to reduce the backlight from entering an ambient light guide disposed adjacent to the button. The ambient light guide may include a light pipe disposed to conduct ambient light to an ambient light sensor.

An electrical device is described. The electrical device includes a backlight source. The electrical device also includes an ambient light sensor. The electrical device further includes a button positioned over the backlight source. The button includes a transparent molded member. The button also includes an opaque molded member attached to the transparent molded member. The opaque molded member includes a window to permit a backlight from the backlight source to pass to the transparent molded member, and a shield positioned along an edge of the transparent molded member. The shield is disposed to reduce the backlight from exiting at the edge of the transparent molded member.

The shield may be disposed to reduce the backlight from entering an ambient light guide disposed adjacent to the button. The ambient light guide may be disposed to conduct ambient light to the ambient light sensor.

The shield may extend along an entire periphery of the transparent molded member. An outer surface of the shield may be flush with the edge of the transparent molded member.

The transparent molded member may include a lip along the edge. The lip may be disposed over a step structure of the opaque molded member.

The transparent molded member may include a bevel between a facial surface and a side surface of the transparent molded member. The transparent molded member may include a platform disposed in the window of the opaque molded member. The platform may include first teeth intermeshed with second teeth of the opaque molded member.

An electrical device is a device that operates with electricity and/or that controls electricity. Examples of an electrical device include a light switch, wall switch, dimmer, control panel, push button switch, keyboard, mouse, game controller, click pad, touch pad, keypad, doorbell, thermostat, sprinkler controls, vehicle console, etc. Some examples of the electrical devices described herein include and/or utilize a button(s).

In some examples, a button may be backlit. For instance, an electronic device may include a backlight to illuminate a button. A backlit button may provide increased visibility for a user(s). For instance, a backlit button (e.g., backlit light switch, backlit keyboard, backlit thermostat button, etc.) may provide increased utility by enabling ease of location and/or by identifying a function associated with the button in darker environments.

One issue that may occur with backlit buttons is light bleed. For instance, a backlit button may bleed light from a bottom edge of the button. The light bleed may cause a decrease in brightness from a target region (e.g., illuminated character(s), word(s), light(s), etc.) and/or may look visually unappealing. In some examples, light bleed may cause another issue(s), such as impacting the performance of an ambient light sensor. For instance, light from a backlit button may leak into an ambient light sensor, which may impact ambient light measurement accuracy of light in the environment (e.g., room).

Some examples of the techniques and/or structures described herein may address some of the issues with a backlit button. For instance, a button may be manufactured in two stages (e.g., double-shot molding). In some examples, a button may be fabricated such that a bottom edge of the button may be opaque, while another portion (e.g., center, face, etc.) may be transparent to receive and/or transmit backlighting.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a diagram illustrating a perspective view of an example of a button 102 in accordance with some of the techniques and structures described herein. In the example of FIG. 1, the button 102 includes a transparent molded member 104 and an opaque molded member 106. As used herein, the terms “mold,” “molding,” “molded,” etc., may refer to injection molding. For instance, a molded member may be fabricated by injection molding. Some examples of the buttons described herein may be fabricated from a material(s) such as a polymer(s), thermoplastic(s), resin(s), polycarbonate(s), etc. The button 102 is illustrated in FIG. 1 in a height (e.g., z) dimension, a width (e.g., x) dimension, and a depth (e.g., y) dimension.

The transparent molded member 104 may be fabricated using a transparent material. A transparent material may be a material that permits the transmission of light. In some examples, a transparent material may be completely or partially transparent. For instance, the transparent molded member 104 may be fabricated with polycarbonate 945 (without an additive(s), for example) or fabricated with polycarbonate 945 with an additive (e.g., tint, coloring, whitening agent, R69, “milkiness,” etc.) that causes the transparent molded member 104 to be semi-transparent. In some examples, an additive may increase light diffusion (e.g., dispersion) in the transparent molded member 104 and/or reduce heat concentration (e.g., hot spot(s)) in the transparent molded member 104.

In some examples, the transparent molded member 104 may transmit light provided to (e.g., emitted to) the transparent molded member 104. For instance, the button 102 may be attached to and/or included in an electrical device that supplies light (e.g., backlight) to a rear portion of the transparent molded member 104. In some examples, the light may be produced using a light emitting diode(s) (LED(s)) and/or guided to the transparent molded member 104 using a backlight guide. An example of a backlight guide is given in relation to FIG. 4.

In some examples, a facial surface of the transparent molded member 104 may be covered with a paint(s). For instance, the paint(s) may be opaque and/or may block light from exiting an outer (e.g., front, facial, etc.) surface(s) of the transparent molded member 104. In some examples, the paint(s) may be etched (e.g., cut, carved, laser-etched, and/or removed, etc.) to allow backlight to exit the outer (e.g., front, facial, etc.) surface in a location where the paint is etched. For instance, a shape(s), character(s), symbol(s), number(s), and/or label(s) may be etched into the paint. The etching may indicate a function (e.g., ↑, ↓, ←, →, “Light,” “Cool,” “Heat,” “Start,” “Open,” “Evening Mode,” etc.) and/or location (e.g., “Kitchen,” “Front Porch,” “Lobby,” etc.) associated with the button.

The opaque molded member 106 may be fabricated using an opaque material. An opaque material may be a material that blocks, prevents, and/or impedes the transmission of light. For instance, the opaque molded member 106 may be fabricated with polycarbonate 945 (with an additive(s), for example) that causes the opaque molded member 106 to be opaque. In some examples, the opaque molded member 106 may be fabricated with gray Lexan® 945. In some examples, the opaque molded member 106 may be fabricated with a material that is different from a material of the transparent molded member 104. For instance, the opaque molded member 106 may be fabricated with a different compound (e.g., different resin, plastic, etc.) from that of the transparent molded member 104. In some examples, the material of the transparent molded member 104 may have a different material property (e.g., setting rate, hardening rate, cooling rate, stiffness, elasticity, bonding, melting point, etc.) from that of the opaque molded member 106. In some examples, the opaque molded member 106 may be fabricated with a material that is the same as a material of the transparent molded member 104. In some examples, the opaque molded member 106 may have a different additive from an additive of the transparent molded member 104, or the opaque molded member 106 may have an additive while the transparent molded member 104 does not include an additive.

In some examples, the transparent molded member 104 and the opaque molded member 106 may be manufactured in two stages. For instance, the transparent molded member 104 may be formed (e.g., injection molded) first, and then the opaque molded member 106 may be formed (e.g., injection molded) second. In some examples, the opaque molded member 106 may be formed first, and then the transparent molded member 104 may be formed second. In some examples, the opaque molded member 106 is attached to the transparent molded member 104. For instance, the injection molding may bond the transparent molded member 104 and the opaque molded member 106 (e.g., the transparent molded member 104 and the opaque molded member 106 may bond while cooling).

In some examples, the opaque molded member 106 includes a shield 108 positioned along an edge of the transparent molded member 104. The shield 108 may be a wall or barrier (e.g., an opaque wall or barrier). In the example of FIG. 1, the shield 108 is positioned along the bottom edge of the transparent molded member 104. The shield 108 may be disposed to reduce backlight from exiting at an edge(s) of the transparent molded member 104. For instance, the shield 108 may block light from bleeding from the bottom edge of the transparent molded member 104. In some examples, the shield 108 may be disposed to reduce the backlight from entering an ambient light guide disposed adjacent to the button 102. In some examples, the ambient light guide may include a light pipe disposed to conduct ambient light to an ambient light sensor. For instance, the shield 108 may be disposed between the transparent molded member 104 and an ambient light sensor and/or an ambient light guide.

In some examples, the shield 108 may extend along an entire periphery of the transparent molded member 104. For instance, the shield 108 may extend along the side edges (e.g., the entire outer edge) of the transparent molded member 104. In some examples, an outer surface of the shield 108 is flush with the edge of the transparent molded member 104. For instance, the shield 108 surface may be flush with (e.g., aligned with) the edge of the transparent molded member 104 (e.g., a side surface of the transparent molded member 104).

In some examples, the transparent molded member 104 may include a bevel between a facial surface and a side surface of the transparent molded member 104. For instance, the transparent molded member 104 includes a bevel between the facial surface and the bottom side of the transparent molded member 104. In the example of FIG. 1, the transparent molded member 104 includes a bevel between the facial surface and the top side of the transparent molded member 104.

Some examples of the techniques described herein may include a method to manufacture and/or fabricate the button 102. For instance, an injection molding apparatus may inject a first material into a mold to produce the transparent molded member 104. The injection molding apparatus may inject a second material into a mold (e.g., the same or different mold as the mold utilized to produce the transparent molded member 104). For instance, the injection molding apparatus may inject the second material into the mold during or after the cooling, setting, and/or hardening of the injected first material. The method may include manufacturing one or more of the aspects of one or more of the buttons described herein. In some examples, the first material may be injected first, followed by the second material. In some examples, the second material may be injected first, followed by the first material.

Figure 2:
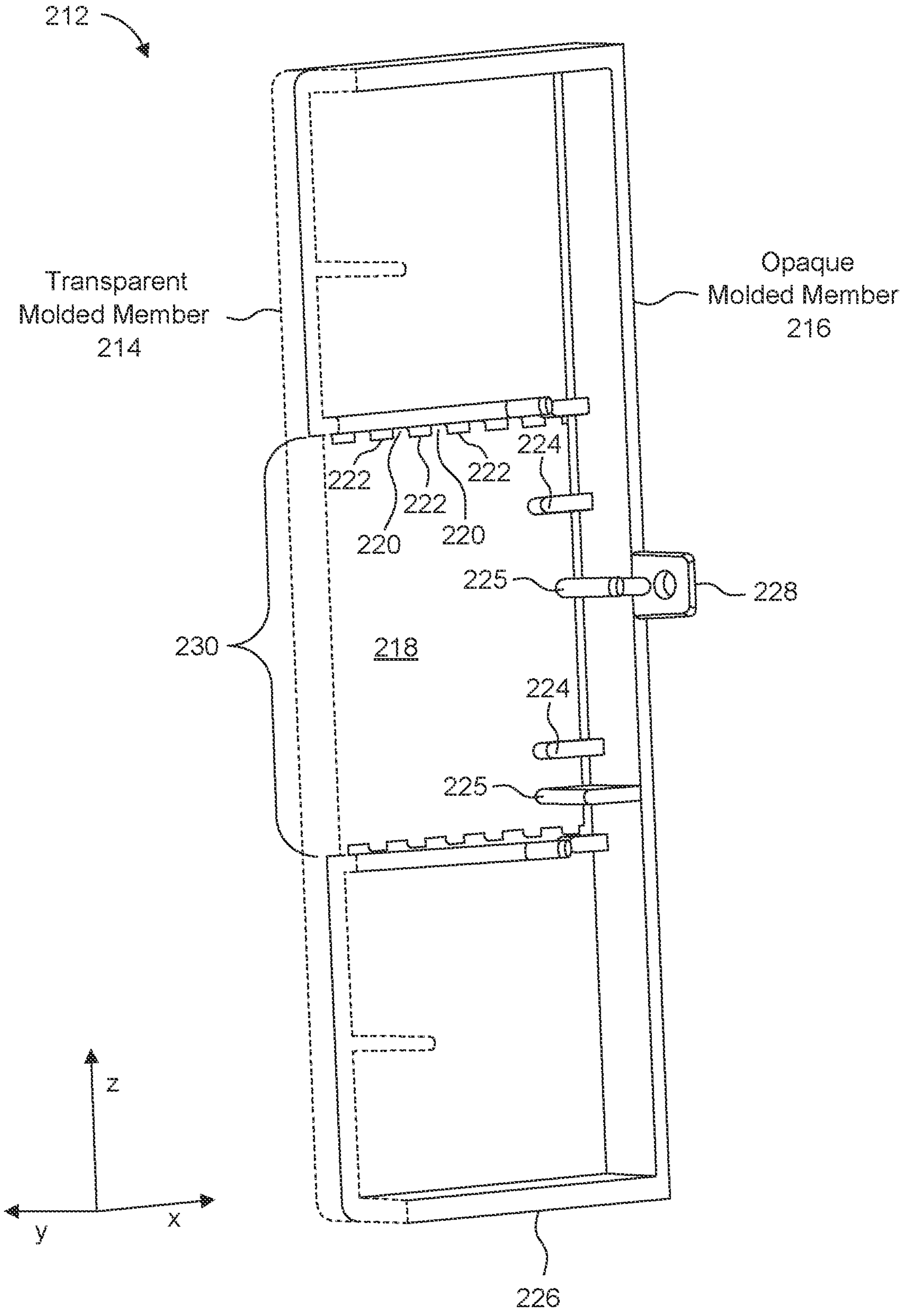
FIG. 2 is a cross-sectional perspective view of an example of a button in accordance with some of the techniques and structures described herein.

FIG. 2 is a cross-sectional perspective view of an example of a button 212 in accordance with some of the techniques and structures described herein. The button 212 illustrated in FIG. 2 may be an example of the button 102 described in relation to FIG. 1. FIG. 2 illustrates a back or rear view of the button 212.

The button 212 may include a transparent molded member 214 and an opaque molded member 216. In the example of FIG. 2, the transparent molded member 214 includes a platform 218 disposed in a window 230 of the opaque molded member 216. For instance, the platform 218 may be a first portion of the transparent molded member 214 that protrudes relative to a second portion of the transparent molded member 214. For instance, the platform 218 is a first portion of the transparent molded member 214 that is thicker (e.g., thicker in depth, thicker front-to-back, thicker in the y dimension, and/or thicker relative to a facial surface of the transparent molded member 214) than a second portion of the transparent molded member 214 (e.g., second portion of the transparent molded member 214 disposed above and/or below the platform 218, and/or disposed to interface with a non-window portion(s) of the opaque molded member 216).

In some examples, the platform 218 may include first teeth 220 intermeshed with second teeth 222 of the opaque molded member 216. For instance, the platform 218 may include teeth along one or more edges (e.g., a top edge and a bottom edge) of the platform 218. The platform 218 teeth may intermesh with teeth along or more edges (e.g., a top edge and a bottom edge) of the window 230.

In some examples, the opaque molded member 216 may include one or more alignment features 224 disposed on the platform 218 to align a backlight guide. For instance, each alignment feature 224 may be an arm extending partially across the window 230 and/or platform 218. The one or more alignment features 224 may interface with (e.g., may be disposed within) a feature(s) (e.g., a notch(es) and/or step(s), etc.) of the backlight guide when the backlight guide is installed (e.g., when the backlight guide is disposed in the window 230 and/or on the platform 218).

In some examples, the opaque molded member 216 may include one or more supports 225 disposed on the platform 218 to support the platform 218. For instance, each support 225 may be an arm extending partially across the window 230 and/or platform 218. In some examples, the one or more supports 225 may interface with (e.g., may guide) a feature (e.g., a tab, etc.) of the backlight guide when the backlight guide is installed (e.g., when the backlight guide is disposed in the window 230 and/or on the platform 218). For instance, a tab of the backlight guide may fit between the supports 225. The one or more supports 225 may have a greater depth and/or thickness than the one or more alignment features 224.

In some examples, the opaque molded member 216 may include an attachment feature(s). For instance, the opaque molded member 216 includes a tab 228 with a hole to interface with an electrical device. For example, the opaque molded member 216 may include a pair of tabs with holes to fit onto protrusions (e.g., nubs, knobs, etc.) of the electrical device. In some examples, the opaque molded member 216 may include a shield 226. The shield 226 may be an example of the shield 108 described in relation to FIG. 1.

Figure 3:
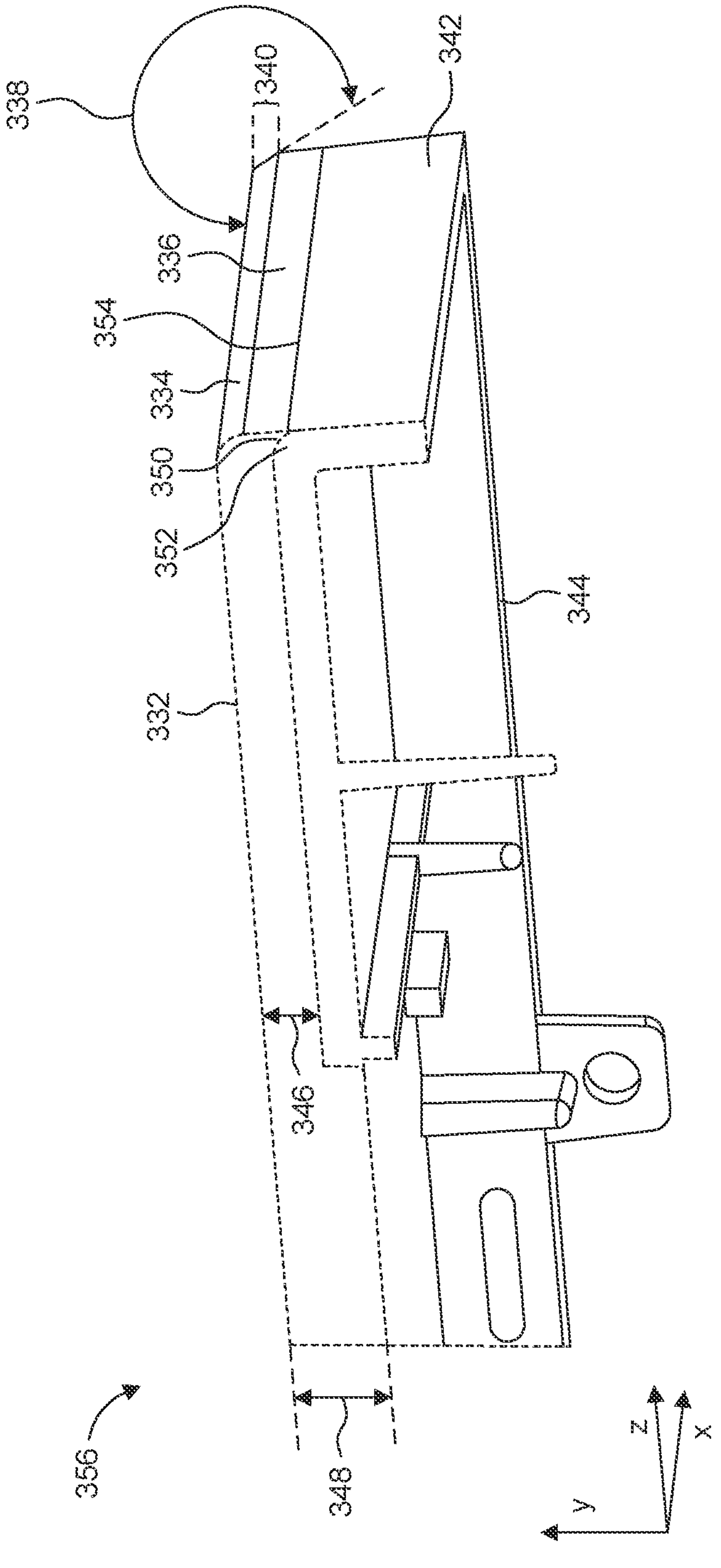
FIG. 3 is a cross-sectional perspective view of an example of a portion of a button in accordance with some of the techniques and structures described herein.

FIG. 3 is a cross-sectional perspective view of an example of a portion of a button 356 in accordance with some of the techniques and structures described herein. The button 356 illustrated in FIG. 3 may be an example of the button 102 described in relation to FIG. 1 and/or of the button 212 described in relation to FIG. 2.

The button 356 may include a transparent molded member 332 and an opaque molded member 344. In the example of FIG. 3, the transparent molded member 332 includes a platform with a first thickness 348 disposed in a window of the opaque molded member 344. The first thickness 348 of the transparent molded member 332 is thicker (e.g., thicker in depth, thicker front-to-back, thicker in the y dimension, and/or thicker relative to a facial surface of the transparent molded member 332) than a second thickness 346 of the transparent molded member 332 (from the facial surface of the transparent molded member 332 to a surface interfacing with the opaque molded member 344, for instance).

In the example of FIG. 3, the opaque molded member 344 includes a shield 342 positioned along an edge 354 of the transparent molded member 332. In some examples, an outer surface of the shield 342 is flush with the edge 354 of the transparent molded member 332. For instance, the shield 342 surface may be flush with (e.g., aligned with) the edge 354 of the transparent molded member 332 (e.g., a side surface 336 of the transparent molded member 332).

In the example of FIG. 3, the transparent molded member 332 includes a bevel 334 between a facial surface and a side surface 336 of the transparent molded member 332. For instance, the transparent molded member 332 includes a bevel 334 between the facial surface and the bottom side surface 336 of the transparent molded member 332. The bevel 334 may be disposed at an angle 338 relative to the facial surface of the transparent molded member 332. In some examples, the angle 338 may be in a range of 181° to 269° (e.g., 239°). In some examples, the bevel 334 may have a thickness 340. For instance, the bevel 334 may have a thickness in a range of 0.1 millimeter (mm) to 2 mm (e.g., 0.9 mm).

In some examples, the transparent molded member 332 includes a lip 350. The lip 350 may be disposed along the edge 354. In some examples, the lip 350 is disposed over a step structure 352 of the opaque molded member 344.

Figure 4:
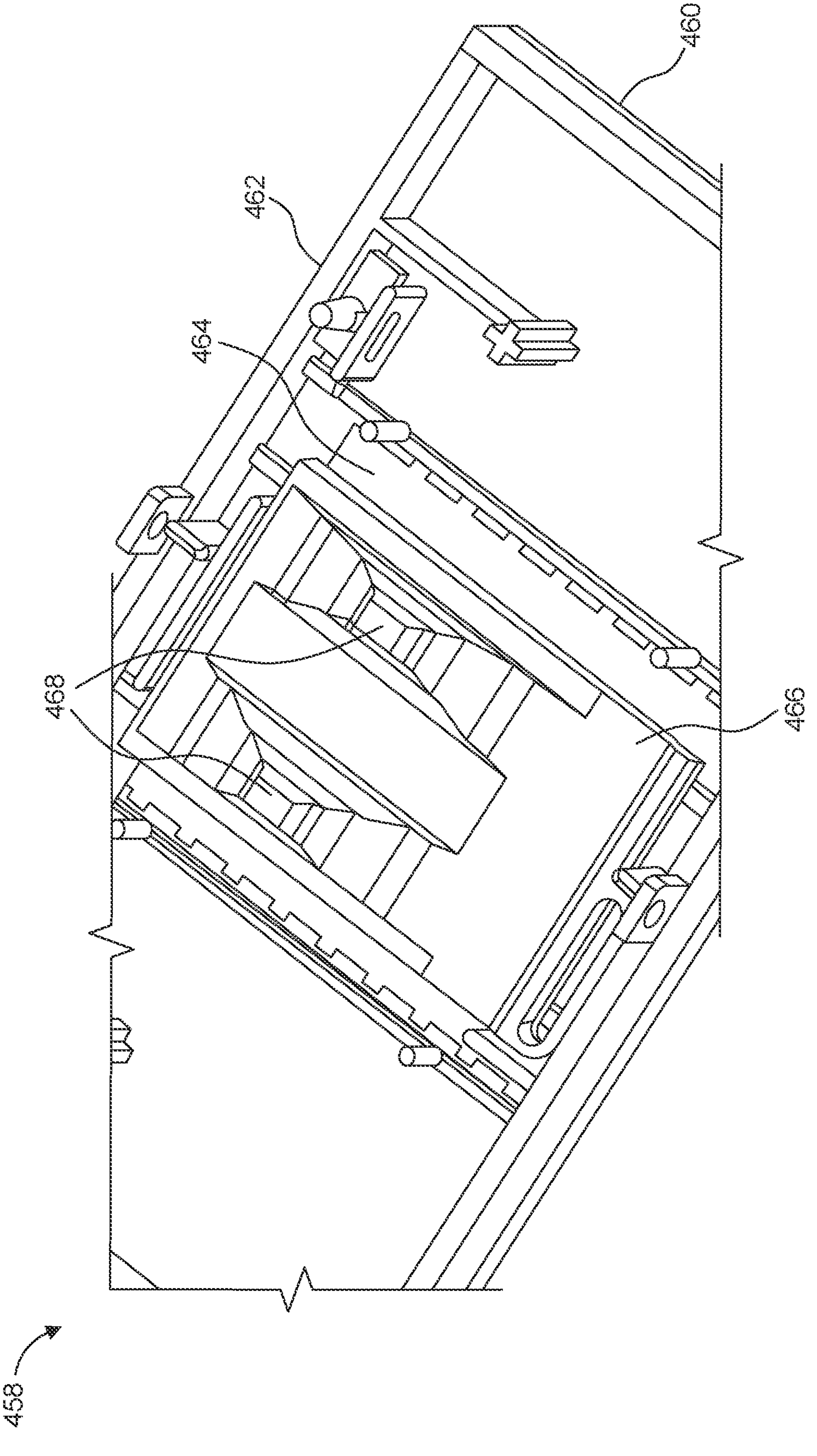
FIG. 4 is a perspective view of an example of a portion of a button in accordance with some of the techniques and structures described herein.

FIG. 4 is a perspective view of an example of a portion of a button 458 in accordance with some of the techniques and structures described herein. The button 458 illustrated in FIG. 4 may be an example of one or more of the buttons 102, 212, 356 described in relation to one or more of FIGS. 1-3.

The button 458 may include a transparent molded member 460 and an opaque molded member 462. In the example of FIG. 4, the transparent molded member 460 includes a platform 464 disposed in a window of the opaque molded member 462. FIG. 4 also illustrates a backlight guide 466. The backlight guide 466 may be disposed on the platform 464 of the transparent molded member 460 and/or in the window of the opaque molded member 462. In the example of FIG. 4, the backlight guide 466 is fabricated from a transparent material (e.g., polycarbonate). The backlight guide 466 may be coated (e.g., painted) with an opaque coating on a back and sides of the backlight guide 466. In some examples, one or more channels 468 (at the back, for instance) of the backlight guide 466 may not be coated to allow light to pass into to the backlight guide 466 (e.g., to pass from an electrical device, LED(s), etc.). In some examples, the channel(s) 468 may protrude from the backlight guide 466 and/or may extend the backlight guide 466. In some examples, the channel(s) 468 may be disposed in (e.g., fit within) a corresponding notch(es) of an electrical device when the button 458 is attached to the electrical device.

Figure 5:
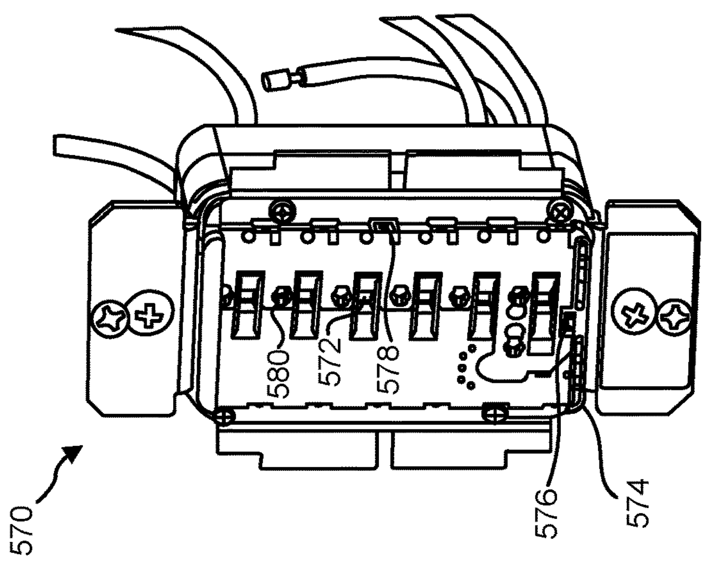
FIG. 5 is a perspective view of an example of an electrical device.

FIG. 5 is a perspective view of an example of an electrical device 570. The electrical device 570 may be an example of the electrical devices described in relation to one or more of FIGS. 1-4. In the example of FIG. 5, the electrical device 570 may be a wall switch. For instance, the electrical device 570 may be utilized to control a lighting load(s) (e.g., activate/deactivate a light, change a dimming level, etc.), to switch a home automation mode(s), control a thermostat, activate/deactivate a security system, etc.

In some examples, the electrical device 570 may include a feature(s) to install and/or attach one or more buttons. For instance, the electrical device 570 may include protrusions (e.g., nubs) to attach one or more buttons. An example of a protrusion 578 is shown in FIG. 5.

In some examples, the electrical device 570 may include one or more actuators to detect a button press. For instance, the electrical device 570 may include one or more actuators that may be engaged by one or more features (e.g., post(s)) on the back(s) of one or more buttons. In some examples, a post on the back of a button may depress an actuator of the electrical device 570, which may respond by performing an operation (e.g., performing a switch, activation, deactivation, adjustment, control, etc.). An example of an actuator 580 is illustrated in FIG. 5.

In some examples, the electrical device 570 may include one or more backlight sources. For instance, the electrical device 570 may include a backlight source 572 (e.g., an LED) to illuminate a button. In some examples, the one or more backlight sources may be configured to provide light to one or more backlight guides. For instance, a backlight source may be disposed relative to (e.g., in, behind, etc.) a notch, which may accommodate, house, and/or engage with a channel of a backlight guide. For instance, the backlight source 572 may be disposed at a back of a notch as illustrated in FIG. 5.

In some examples, the electrical device 570 may include one or more ambient light sensors. For instance, the electrical device 570 may include an ambient light sensor 576. In some examples, the ambient light sensor 576 may be utilized to detect ambient light from an environment. For instance, the electrical device 570 may utilize a level of detected ambient light to adjust a degree of backlighting (e.g., brightness of the backlight source 572). For example, when the ambient light level declines or is relatively low (e.g., declines below a threshold ambient light level), the electrical device 570 may reduce the brightness of the backlight source 572, which may reduce energy consumption and/or may provide backlighting according to the ambient light level. For instance, reducing the level of the backlight source 572 when ambient light is low may avoid producing bright light when a target light level is low and/or may avoid producing light at an uncomfortable level for a user.

In some examples, when the ambient light level increases or is relatively high (e.g., satisfies a threshold ambient light level), the electrical device 570 may increase the brightness of the backlight source 572, which may provide backlighting according to the ambient light level. For instance, increasing the level of the backlight source 572 when ambient light is high may enable producing visible light (e.g., an illuminated label(s)) in a bright environment. In some examples, the electrical device 570 may control backlighting brightness proportional to the detected ambient light level.

In some examples, the electrical device 570 includes an ambient light guide 574 (e.g., light pipe). The ambient light guide 574 may conduct ambient light from an environment to the ambient light sensor 576. Some examples of the techniques and structures described herein may reduce and/or block backlighting from entering the ambient light guide 574 and/or ambient light sensor 576. For instance, if backlighting were to enter the ambient light guide 574 and/or ambient light sensor 576, the backlighting could reduce ambient light detection performance and/or backlighting control performance. Some examples of the techniques and/or structures described herein may help to reduce or avoid backlighting from bleeding to the ambient light guide 574 and/or ambient light sensor 576.

Figure 6:
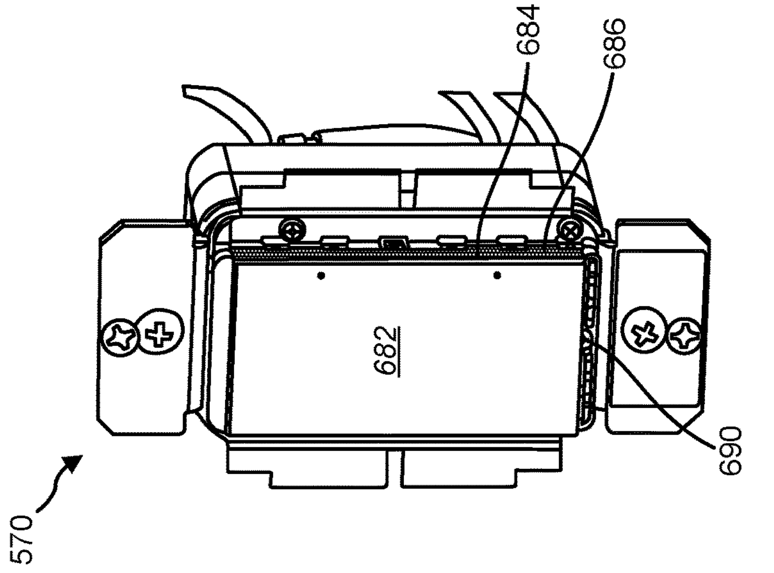
FIG. 6 is a perspective view of an example of the electrical device with a button.

FIG. 6 is a perspective view of an example of the electrical device 570 with a button 682. The button 682 may be positioned over the backlight source 572. The button may include a transparent molded member 684 and/or an opaque molded member 686. The button 682 may be an example of one or more of the buttons 102, 212, 356, 458, etc., described herein. For instance, the transparent molded member 684 may include one or more of the aspects described in relation to one or more of FIGS. 1-4. In some examples, the opaque molded member 686 may include one or more of the aspects described in relation to one or more of FIGS. 1-4.

In some examples, the opaque molded member 686 may include a window to permit a backlight from the backlight source 572 to pass to the transparent molded member 684. In some examples, the opaque molded member 686 may include a shield 690 positioned along an edge of the transparent molded member 684. The shield 690 may be disposed to reduce the backlight from exiting at the edge of the transparent molded member 684. For instance, the shield 690 may be disposed to reduce the backlight from entering the ambient light guide 574 disposed adjacent to the button 682, where the ambient light guide 574 is disposed to conduct ambient light to the ambient light sensor 576.

Figure 7:
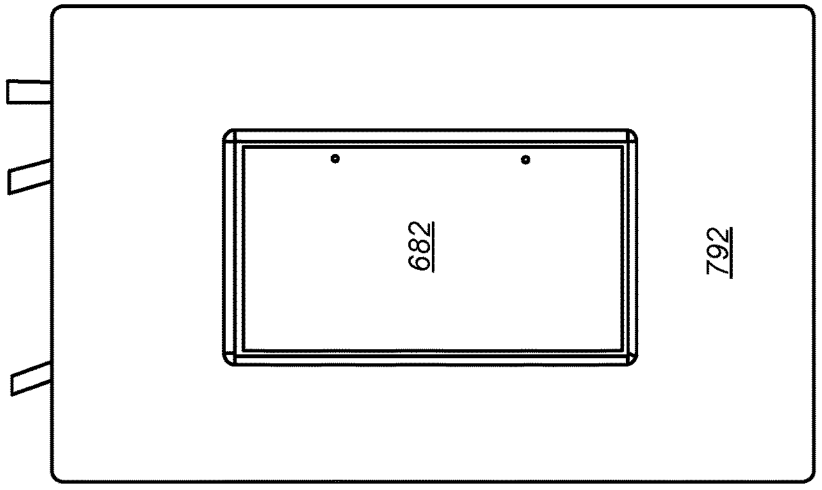
FIG. 7 is a front view of an example of the electrical device with the button and a face plate.

FIG. 7 is a front view of an example of the electrical device 570 with the button 682 and a face plate 792. The button 682 may be an example of one or more of the buttons described herein. In some examples, the face plate 792 may be attached to the electrical device 570. For instance, a subplate (not shown in FIG. 7) may be attached to the electrical device 570 (e.g., may be screwed to a yoke plate of the electrical device 570). The face plate 792 may be attached to the subplate (e.g., mechanically interfaced with the subplate, snapped to the subplate, etc.).

In some examples, the electrical device 570 may be configured to be contained within a wall box and/or attached to a wall box. A wall box (e.g., electrical box, outlet box, switch box, pattress, etc.) is a container capable of housing the body of an electrical device (e.g., light switch, power outlet, dimmer, etc.). While housed in the wall box, the face plate 792 of the electrical device 570 may be disposed in contact with (e.g., on, against, etc.) a wall. In some examples, the width of a wall box may be measured in "gangs," which indicates the number of electrical devices (e.g., light switches, power outlets, dimmers, etc.) that the wall box can hold. For example, a single-gang wall box may hold a single electrical device and a double-gang wall box may hold two electrical devices (side by side, for example). The depth of a wall box may be standard depth, shallow depth, or deep depth. In some configurations of the systems and methods disclosed herein, a wall box may be a single-gang standard depth wall box and a wall box device may be an electrical device 570 that may be held in a single-gang standard depth wall box. In one configuration, a European style wall box having a width of 86 millimeters, a height of 86 millimeters and a depth of 35 millimeters may be used. In another configuration, a United States style, single-gang, standard depth wall box may be used. It should be noted that some configurations of the systems and methods disclosed herein may not be housed in a wall box. For example, some configurations of the systems and methods disclosed herein may be implemented in lighting devices that are not housed in wall boxes. Additionally or alternatively, a spacer may be utilized in some configurations that places a portion of the device (e.g., an electrical device 570) outside of a wall box.

Figure 8:
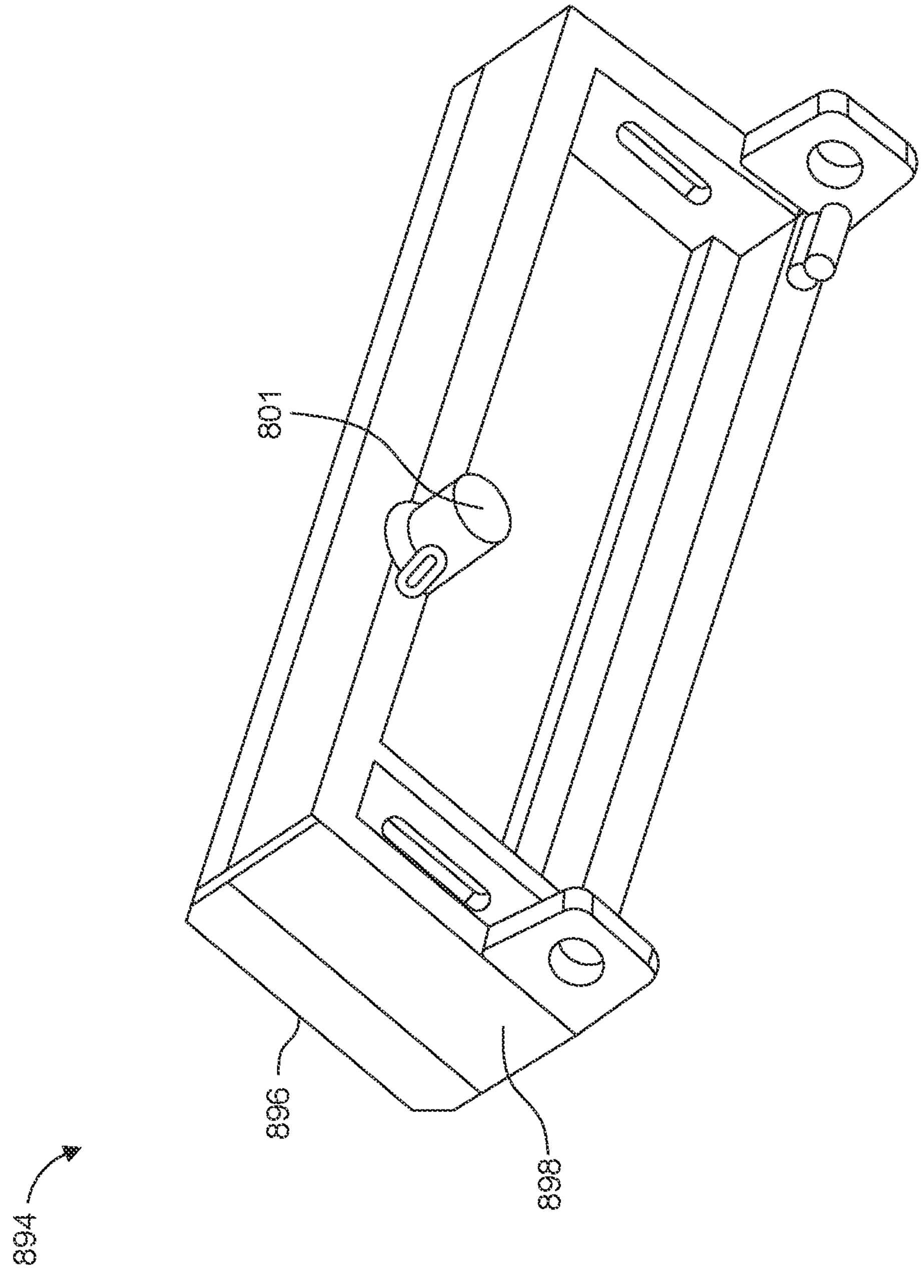
FIG. 8 is a perspective view of an example of a button.

FIG. 8 is a perspective view of an example of a button 894. The button may include a transparent molded member 896 and/or an opaque molded member 898. The button 894 may include one or more aspects similar to aspects described in relation to one or more of the buttons 102, 212, 356, 458, 682, etc., described herein. For instance, the transparent molded member 896 may include one or more of the aspects described in relation to one or more of FIGS. 1-7. In some examples, the opaque molded member 898 may include one or more of the aspects described in relation to one or more of FIGS. 1-7. The button 894 may include a feature 801 (e.g., post) to interface with (e.g., press) an actuator of an electrical device.

In some examples, multiple buttons may be attached to an electrical device. For instance, the button 894 illustrated in FIG. 8 may be attached to an electrical device, while allowing one or more other buttons may be attached to the electrical device.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The method(s) disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A button structure, comprising:

a button including: (1) a transparent molded member having a facial surface for pressing the button; and (2) an opaque molded member: including a shield; and an ambient light guide disposed adjacent to the button, wherein, the opaque molded member is attached to a bottom side of the transparent molded member opposite to the facial surface of the transparent molded member, and wherein, the shield is disposed along an edge of the transparent molded member to reduce backlight from exiting at the edge of the transparent molded member and entering the ambient light guide.

2. The button of claim 1, wherein the shield extends along an entire periphery of the transparent molded member.

3. The button of claim 1, wherein an outer surface of the shield is flush with the edge of the transparent molded member.

4. The button of claim 1, the transparent molded member comprising a lip along the edge, wherein the lip is disposed over a step structure of the opaque molded member.

5. The button of claim 1, the transparent molded member comprising a bevel between a facial surface and a side surface of the transparent molded member.

6. The button of claim 1, the transparent molded member comprising a platform disposed in a window of the opaque molded member.

7. The button of claim 6, wherein the platform comprises first teeth intermeshed with second teeth of the opaque molded member.

8. The button of claim 6, wherein the opaque molded member comprises an alignment feature disposed on the platform to align a backlight guide.

9. The button of claim 1, wherein a facial surface of the transparent molded member is covered with a paint.

10. The button of claim 9, wherein the paint is etched to allow the backlight to exit the facial surface in a location where the paint is etched.

11. The button of claim 1, wherein the ambient light guide comprises a light pipe disposed to conduct ambient light to an ambient light sensor.

12. An electrical device, comprising:

a backlight source;

an ambient light sensor;

an ambient light guide disposed to conduct ambient light to the ambient light sensor; and a button positioned adjacent to the ambient light guide and over the backlight source, the button comprising:

a transparent molded member having a facial surface for pressing the button; and an opaque molded member: (1) including a shield and a window to permit a backlight from the backlight source to pass to the transparent molded member, and (2) attached to a bottom side of the transparent molded member opposite to the facial surface of the transparent molded member, wherein the shield is disposed along an edge of the transparent molded member to reduce the backlight from exiting at the edge of the transparent molded member and entering the ambient light guide.

13. The electrical device of claim 12, wherein the shield extends along an entire periphery of the transparent molded member.

14. The electrical device of claim 12, wherein an outer surface of the shield is flush with the edge of the transparent molded member.

15. The electrical device of claim 12, the transparent molded member comprising a lip along the edge, wherein the lip is disposed over a step structure of the opaque molded member.

16. The electrical device of claim 12, the transparent molded member comprising a bevel between a facial surface and a side surface of the transparent molded member.

17. The electrical device of claim 12, the transparent molded member comprising a platform disposed in the window of the opaque molded member.

18. The electrical device of claim 17, wherein the platform comprises first teeth intermeshed with second teeth of the opaque molded member.

* * * * *